(12) United States Patent
Liu et al.

(10) Patent No.: US 10,768,763 B2
(45) Date of Patent: Sep. 8, 2020

(54) TOUCH PANEL STRUCTURE AND FLEXIBLE TOUCH DISPLAY DEVICE

(71) Applicant: Wuhan China Star Optoelectronics Semiconductor Display Technology Co., Ltd., Wuhan, Hubei (CN)

(72) Inventors: Minlun Liu, Hubei (CN); Qibing Dai, Hubei (CN); Dan Lin, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 296 days.

(21) Appl. No.: 15/753,766

(22) PCT Filed: Feb. 11, 2018

(86) PCT No.: PCT/CN2018/076325
§ 371 (c)(1),
(2) Date: Feb. 20, 2018

(87) PCT Pub. No.: WO2019/144447
PCT Pub. Date: Aug. 1, 2019

(65) Prior Publication Data
US 2020/0133435 A1    Apr. 30, 2020

(30) Foreign Application Priority Data
Jan. 25, 2018    (CN) .......................... 2018 1 0073931

(51) Int. Cl.
*G06F 3/044*    (2006.01)
*G06F 3/041*    (2006.01)
(52) U.S. Cl.
CPC .......... *G06F 3/0443* (2019.05); *G06F 3/0412* (2013.01); *G06F 3/0446* (2019.05);
(Continued)

(58) Field of Classification Search
CPC ....................... G06F 2203/04111; G06F 3/044
See application file for complete search history.

(56) References Cited

U.S. PATENT DOCUMENTS

2011/0304578 A1* 12/2011 Kim ........................ G06F 3/044
345/174
2012/0229395 A1    9/2012 Shin
(Continued)

FOREIGN PATENT DOCUMENTS

| CN | 102799323 A | 11/2012 |
|---|---|---|
| CN | 103700320 A | 4/2014 |

(Continued)

*Primary Examiner* — Sanjiv D. Patel
(74) *Attorney, Agent, or Firm* — Hemisphere Law, PLLC; Zhigang Ma

(57) ABSTRACT

The present disclosure provides a touch panel structure and a flexible touch display device. The touch panel structure includes a plurality of first touch electrode chains and a plurality of second touch electrode chains insulated from and in cross-connection with the first touch electrode chains; each of the first touch electrode chains includes a plurality of spaced-apart first touch electrodes, and the adjacent two of the first touch electrodes are electrically connected through the first connecting portion, the first connecting portion includes at least two conductive bridges; two adjacent second touch electrodes are electrically connected through a second connecting portion, and the first connecting portion is stacked on the second connecting portion and insulated from the second connecting portion. The touch panel structure can not only increase the contact area between the first connection portion and the corresponding touch electrode but also reduce the contact resistance.

10 Claims, 10 Drawing Sheets

(52) U.S. Cl.
CPC .............. *G06F 2203/04102* (2013.01); *G06F 2203/04111* (2013.01)

(56) References Cited

U.S. PATENT DOCUMENTS

| | | | |
|---|---|---|---|
| 2015/0185892 A1* | 7/2015 | Chae | G06F 3/041 |
| | | | 345/173 |
| 2018/0101270 A1* | 4/2018 | Cho | G06F 3/0412 |
| 2018/0120998 A1* | 5/2018 | Jeong | G06F 3/0412 |
| 2018/0224975 A1* | 8/2018 | Koike | G01B 7/22 |

FOREIGN PATENT DOCUMENTS

| | | |
|---|---|---|
| CN | 105677117 A | 6/2016 |
| CN | 105912164 A | 8/2016 |
| CN | 106293202 A | 1/2017 |
| CN | 206058160 U | 3/2017 |
| CN | 206162458 U | 5/2017 |

\* cited by examiner

TOUCH PANEL STRUCTURE AND FLEXIBLE TOUCH DISPLAY DEVICE

RELATED APPLICATIONS

The present application is a National Phase of International Application Number PCT/CN2018/076325, filed on Feb. 11, 2018, and claims the priority of China Application No. 201810073931.2, filed on Jan. 25, 2018.

FIELD OF THE DISCLOSURE

The present disclosure relates to a touch technology field, and more particularly to a touch panel structure and a flexible touch display device.

BACKGROUND OF THE DISCLOSURE

Flexible touch display is a very competitive display technology in the future. One of the great advantages of the flexible touch display device is that it can be bent so that a larger display area can be obtained while occupying less space and being easily portable and applicable. The conventional flexible touch display device generally adopts a flexible substrate, and sequentially fabricates elements such as a thin film transistor and an organic light-emitting diode on a flexible substrate, and finally adds a polarizer, a flexible touch panel and a cover glass.

In order to realize the flexible touch panel to be flexible, the touch wire in the flexible touch panel should be able to endure bending and prevent the problem that the touch wire breaks during repeated bending. It is important to ensure that the electrical properties of the touch control wire are not affected by the physical deformation or are less affected by the touch effect. Therefore, the structural strength and reliability of the touch control wire are very important.

Under the existing technical conditions, due to the characteristics of the touch wire material and the structure of the touch panel, there are still some problems in making a flexible touch panel.

In terms of material, if the material of the touch control wire is Indium Tin Oxide (ITO), although the light transmittance of ITO is good, the bending resistance is poor; if the material of the touch control wire is silver nanowire (AgNW), silver (Ag), silver alloy, etc., the bending resistance is improved, but the light transmittance is poor.

From a structural point of view, please refer to FIG. 1 to FIG. 4 at the same time, the existing flexible touch panel generally adopts the structure of a single-layer bridging and includes a plurality of first touch electrodes 300 disposed in the first direction and parallel to each other, and a plurality of second touch electrodes 500 disposed in the same layer as the first touch electrodes 300 and arranged in the second direction perpendicular to the first direction and parallel to each other. The first touch electrode 300 includes a plurality of first touch electrode blocks 301. Two adjacent ones of the first touch electrode blocks 301 are connected by a connecting strap 302 extending from the first touch electrode block 301. The second touch electrode 500 includes a plurality of second touch electrode blocks 501. Two adjacent ones of the second touch electrode blocks 501 are connected by a conductive bridge 502 crossing the connecting strap 302. An insulating block 400 is disposed between the connecting strap 302 and the conductive bridge 502. Two sides of the conductive bridge 502 respectively contact with a second touch electrode block 501 through a via hole 401 penetrating through the insulating block 400. Further, the conductive bridge 502 is a strap-shaped entity, corresponding to a single connecting wire. There are two prominent problems with such a structure. First, the conductive bridge 502 contacts the second touch electrode 501 only through a single via hole 401, the contact area is small, and the contact resistance is large, which may lead to poor conduction. Second, when the touch panel is bent, the conductive bridge 502 corresponding to a single connecting wire is easily broken by the influence of bending stress, resulting in disconnection and low reliability.

SUMMARY OF THE DISCLOSURE

An object of the present disclosure is to provide a touch panel structure that can increase the contact area between a connecting wire and a corresponding touch electrode and reduce the contact resistance. The connecting wire and the corresponding touch electrode are smoothly conducted, and the bending stress on the connecting wire when the touch panel is bent can be reduced, the risk of wire breakage caused by bending stress can be reduced, and the reliability of the touch panel can also be improved.

Another object of the present disclosure is to provide a flexible touch display device in which the structure of the inner touch panel can not only increase the contact area between the connecting wire and the corresponding touch electrode but also reduce the contact resistance. The connecting wires and the corresponding touch electrodes are smoothly conducted, and the bending stress on the connecting wires when the touch panel is bent can be reduced, the risk of wire breakage caused by bending stress can be reduced, and the reliability of the touch panel can also be improved.

To achieve the above object, the present disclosure firstly provides a touch panel structure including:

a plurality of first touch electrode chains, the plurality of the first touch electrode chains are arranged at intervals, each of the first touch electrode chains includes a plurality of spaced first touch electrodes, the two adjacent first touch electrodes are electrically connected by a first connecting portion, and the first connecting portion includes at least two conductive bridges;

a plurality of second touch electrode chains, the plurality of the second touch electrode chains are arranged at intervals, the second touch electrode chains are cross-insulated from the first touch electrode chains; each of the second touch electrode chains includes a plurality of spaced second touch electrodes, the two adjacent second touch electrodes are electrically connected through a second connecting portion, the first connecting portion is stacked on the second connecting portion and insulated from the second connecting portion.

An insulating block is provided between the second connecting portion and the first connecting portion stacked on the second connecting portion; two ends of each of the conductive bridges respectively contact the two adjacent first touch electrodes through a via hole passing through the insulating block.

Each of the conductive bridges is provided with a plurality of middle openings.

Each of the via holes on the same side of the first connecting portion is not on the same straight line parallel to the second touch electrode chain.

The at least two conductive bridges are parallel to each other, and two adjacent conductive bridges are connected by a connecting strap.

Each of the connecting straps is not on the same straight line parallel to the second touch electrode chain.

The at least two conductive bridges are cross-connected to each other.

The second connecting portion extends from the second touch electrode itself.

The bridge length direction of the conductive bridge is consistent with the bending axis direction of the touch panel.

The present disclosure also provides a flexible touch display device, which includes the above touch panel structure.

The present disclosure also provides a touch panel structure including:

a plurality of first touch electrode chains, the plurality of the first touch electrode chains are arranged at intervals, each of the first touch electrode chains includes a plurality of spaced first touch electrodes, the two adjacent first touch electrodes are electrically connected by a first connecting portion, and the first connecting portion includes at least two conductive bridges; and a plurality of second touch electrode chains, the plurality of the second touch electrode chains are arranged at intervals, the second touch electrode chains are cross-insulated from the first touch electrode chains; each of the second touch electrode chains includes a plurality of spaced second touch electrodes, the two adjacent second touch electrodes are electrically connected through a second connecting portion, the first connecting portion is stacked on the second connecting portion and insulated from the second connecting portion;

wherein an insulating block is provided between the second connecting portion and the first connecting portion stacked on the second connecting portion; two ends of each of the conductive bridges respectively contact the two adjacent first touch electrodes through a via hole passing through the insulating block;

each of the conductive bridges is provided with a plurality of middle openings;

each of the via holes on a same side of the first connecting portion is not on a same straight line parallel to the second touch electrode chain;

the second connecting portion extends from the second touch electrode itself.

The beneficial effects of the present disclosure are as follows: a touch panel structure and a flexible touch display device provided by the present disclosure include a plurality of first touch electrode chains and a plurality of second touch electrode chains insulated and disposed crosswise to the first touch electrode chains. Each of the first touch electrode chains includes a plurality of spaced first touch electrodes, and the adjacent two of the first touch electrodes are electrically connected through a first connecting portion, the first connecting portion includes at least two conductive bridges; the two adjacent second touch electrodes are electrically connected by a second connecting portion, and the first connecting portion is stacked on the second connecting portion and insulated from the second connecting portion. Since the first connecting portion includes at least two conductive bridges, both ends of each of the conductive bridges respectively contact the two adjacent first touch electrodes, the contact area between the first connecting portion and the corresponding touch electrode can be increased, the contact resistance can be reduced, and the first connecting portion and the corresponding touch electrode can be smoothly conducted. Because of the hollowness between the different conductive bridges, the bending stress that the first connecting portion receives when the touch panel is bent can be reduced, so as to reduce the risk of fracture of the connecting wire caused by the bending stress. In addition, even if part of the conductive bridges is damaged, the remaining conductive bridges can still make the first connecting portion and the corresponding touch electrodes form a path, so that the reliability of the touch control circuit can be improved.

BRIEF DESCRIPTION OF THE DRAWINGS

For further understanding of the features and technical contents of the present disclosure, reference should be made to the following detailed description and accompanying drawings of the present disclosure. However, the drawings are for reference only and are not intended to limit the present disclosure.

DETAILED DESCRIPTION OF PREFERRED EMBODIMENTS

Figure 1:
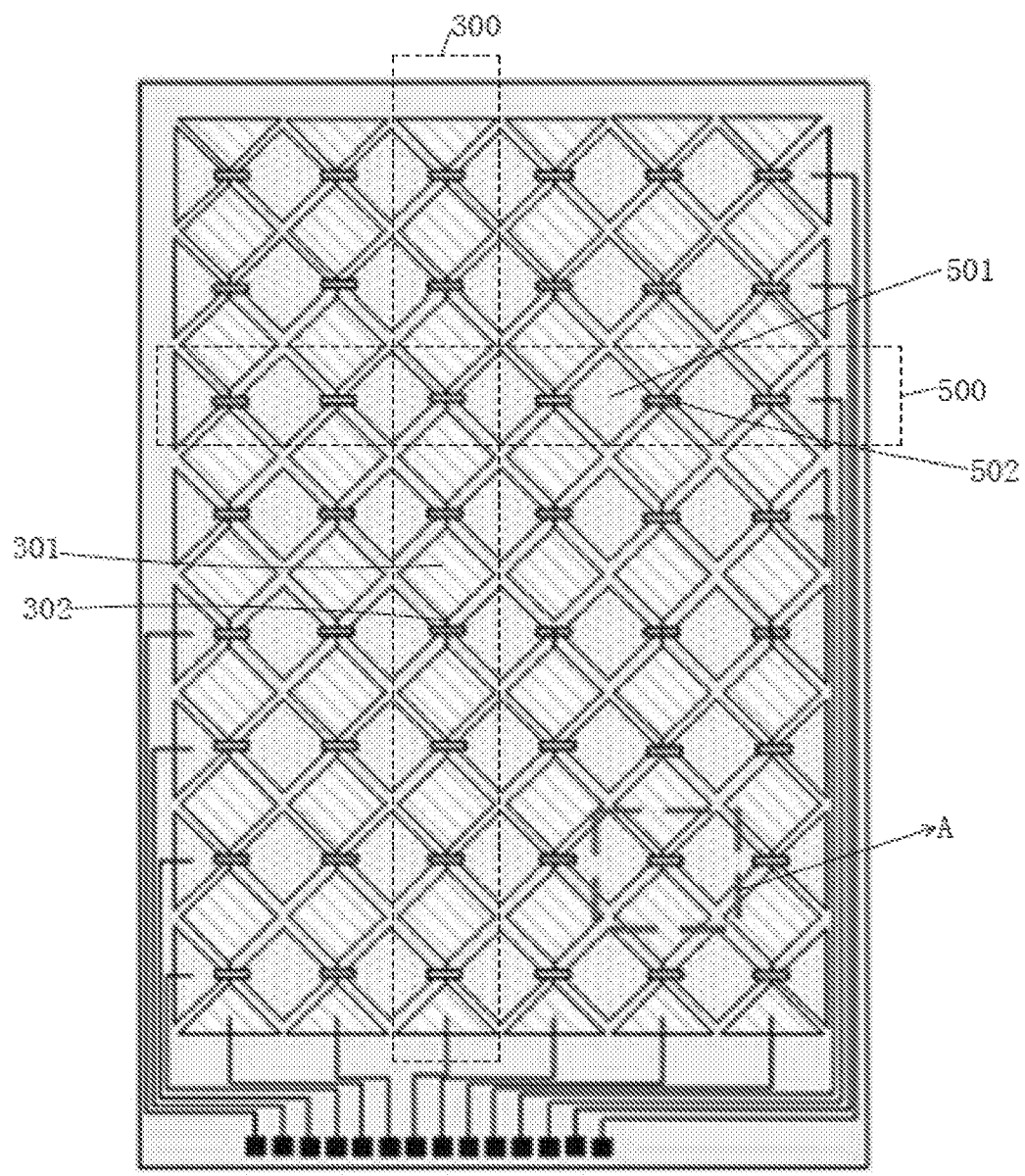
FIG. 1 is a plan diagram of the conventional flexible touch panel structure.
Figure 2:
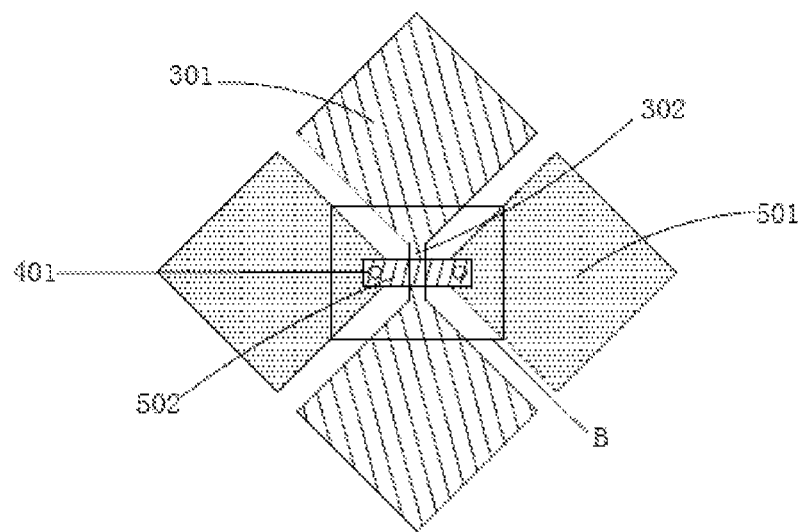
FIG. 2 is a partial enlarged diagram corresponding to A in FIG. 1.
Figure 3:
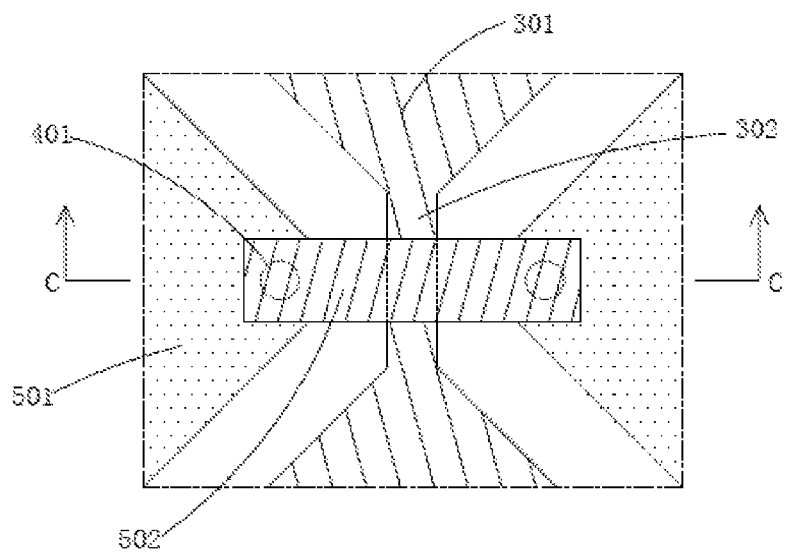
FIG. 3 is a partial enlarged diagram corresponding to B in FIG. 2.
Figure 4:
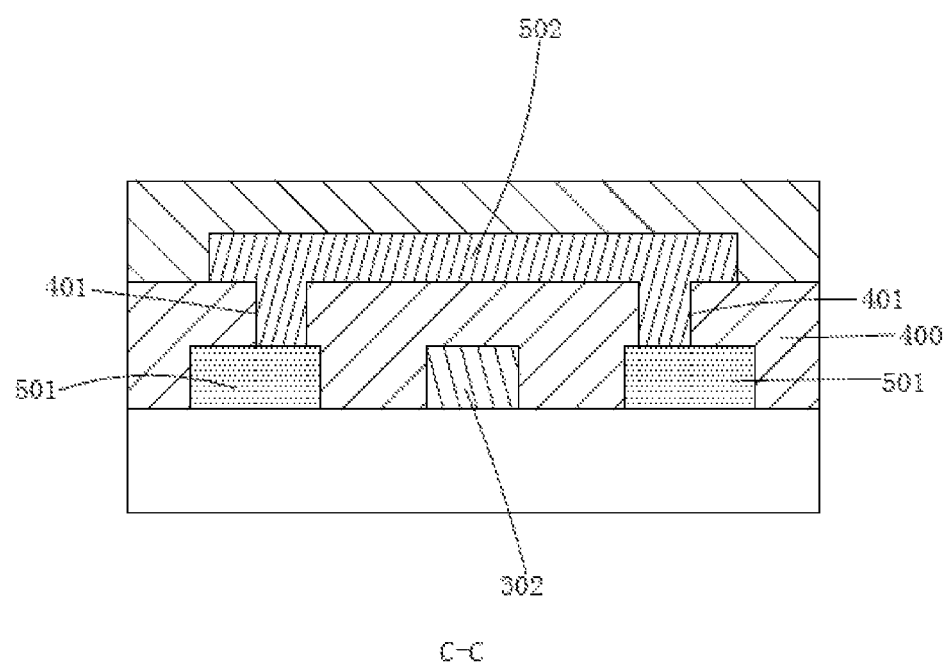
FIG. 4 is a cross-sectional diagram corresponding to C-C in FIG. 3.

To further illustrate the technical means adopted by the present disclosure and the effects thereof, the following describes the preferred embodiments of the present disclosure and the accompanying drawings in detail.

The present disclosure firstly provides a touch panel structure. Please also refer to FIG. 5 to FIG. 9, the first embodiment of the touch panel structure of the present disclosure includes a substrate 1, a plurality of first touch electrode chains 3 disposed on the substrate 1, and a plurality of second touch electrode chains 5 disposed on the substrate 1.

The plurality of the first touch electrode chains 3 are arranged at intervals, each of the first touch electrode chains 3 includes a plurality of spaced-apart first touch electrodes 31, and the adjacent two of the first touch electrodes 31 are electrically connected by a first connecting portion 33. In the first embodiment, the first connecting portion 33 includes two conductive bridges 331.

The plurality of the second touch electrode chains 5 are arranged at intervals, the second touch electrode chains 5 are arranged across and insulated from the first touch electrode chains 3; each of the second touch electrode chains 5 includes a plurality of spaced apart second touch electrodes 51, and two adjacent ones of the second touch electrodes 51 are electrically connected through a second connecting portion 53. The first connecting portion 33 is stacked on the second connecting portion 53 and insulated from the second connecting portion 53.

Specifically, the first touch electrode chain 3 is disposed along a first direction, the second touch electrode chain 5 is disposed along a second direction, the first direction is perpendicular to the second direction. For example, the first direction is a transverse direction, and the second direction is a longitudinal direction. Each of the first touch electrode 31 and the second touch electrode 51 has a rhombus shape. Each of the first touch electrodes 31 and each of the second touch electrodes 51 are insulated and woven into a grid pattern.

Figure 6:
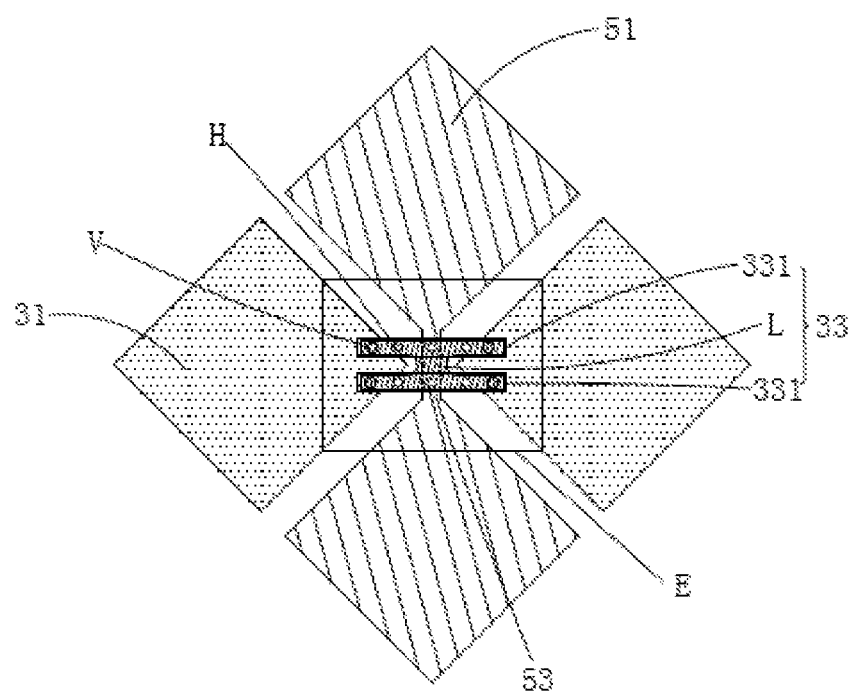
FIG. 6 is a partial enlarged diagram corresponding to the first configuration of D in FIG. 5.
Figure 8:
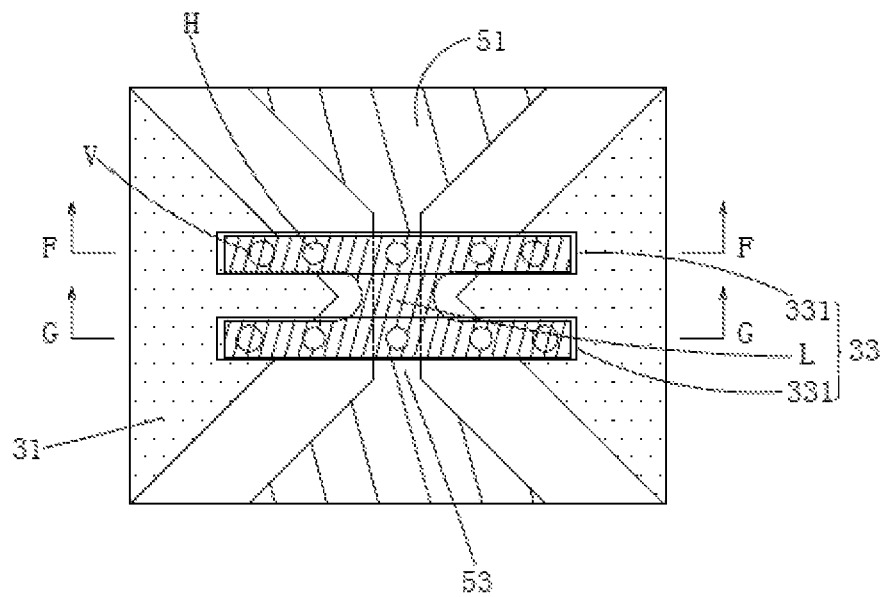
FIG. 8 is a partial enlarged diagram corresponding to E in FIG. 6.
Figure 9:
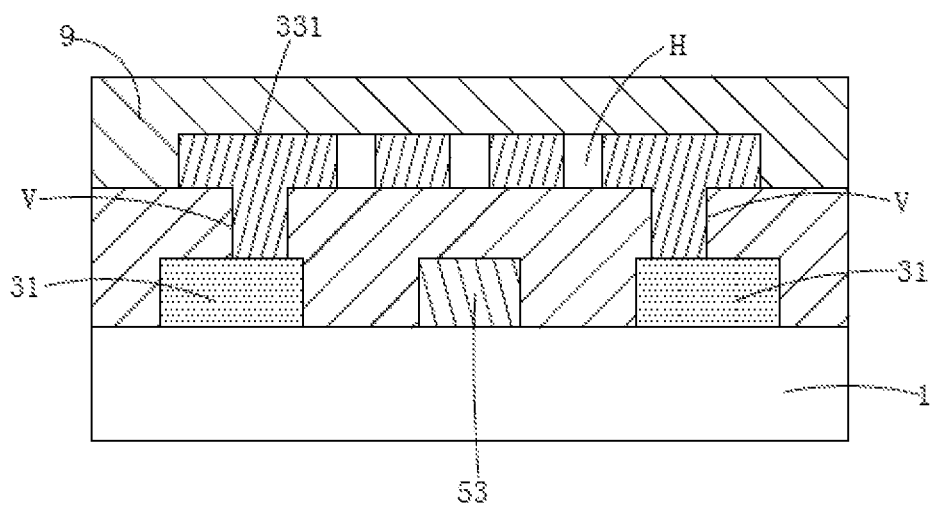
FIG. 9 is a sectional diagram corresponding to F-F and G-G in FIG. 8.

Specifically, referring to FIG. 6, FIG. 8 and FIG. 9, an insulating block 4 is disposed between the second connecting portion 53 and the first connecting portion 33 stacked on the second connecting portion 53. Two ends of each of the conductive bridges 331 respectively contact the two adjacent first touch electrodes 31 via a via hole V penetrating through the insulating block 4. Compared with the prior art of using one conductive bridge to connect the corresponding touch electrodes as shown in FIG. 1 to FIG. 4, in the first embodiment, the contact area between the first connecting portion 33 and the corresponding touch electrode is increased, so that the contact resistance can be reduced and the first connecting portion 33 can be conducted smoothly with the corresponding touch electrode.

Figure 7:
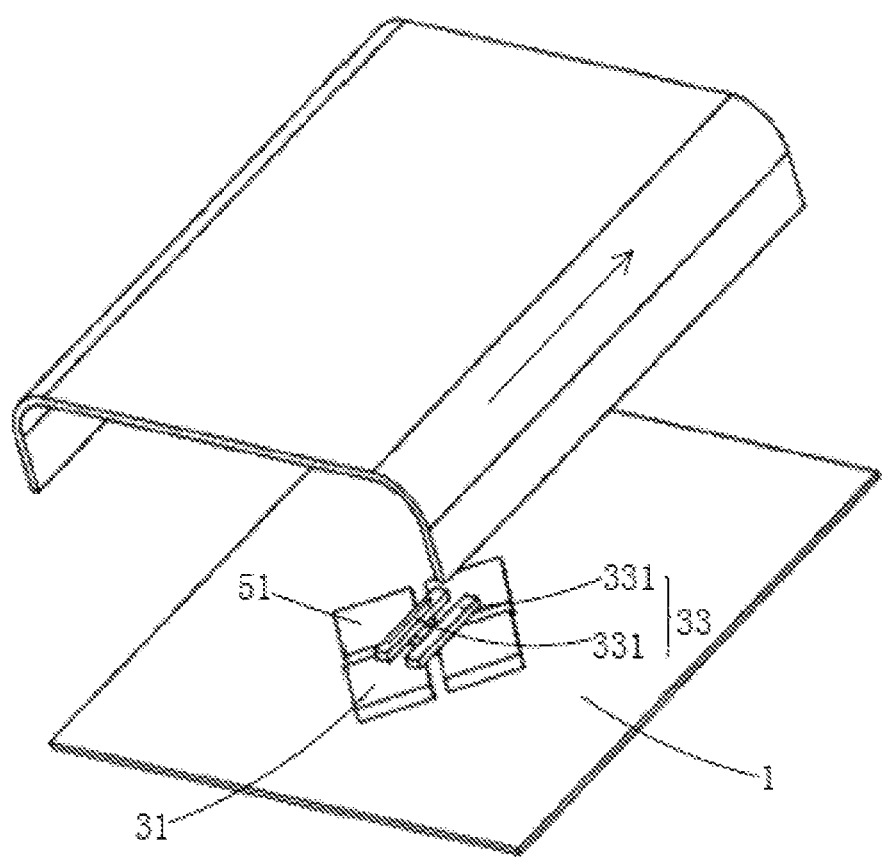
FIG. 7 is a schematic perspective diagram of the first structure corresponding to D in FIG. 5 in the touch panel.

As shown in FIGS. 6, 7 and 8, the two conductive bridges 331 of the first connecting portion 33 are parallel to each other, the two conductive bridges 331 are connected by a connecting strap L, the first connecting portion 33 is substantially "H" shaped except for a portion connected with the connecting strap L, and the other portions of the two conductive bridges 331 are hollowed out. When the touch panel bends, the hollow can play a role of releasing part of the bending stress, reducing the bending stress of the first connecting part 33 when the touch panel bends, and reducing the risk of breaking the wire by the bending stress.

In order to further reduce the bending stress experienced by the first connecting portion 33 and minimize the risk of wire breakage caused by bending stress, the first embodiment also adopts the following design.

1. Each of the conductive bridges 331 is provided with a plurality of middle openings H, and the middle openings H also serve to release part of the bending stress.

2. The two via holes V on the same side of the first connecting portion 33 are not on the same straight line parallel to the second touch electrode 5 chain to avoid concentration of stress caused by the via hole V when the touch panel is bent.

3. As shown in FIG. 7, the bridge length direction of the conductive bridge 331 is consistent with the bending axis direction of the touch panel, which is conducive to the stress release of the conductive bridge 331.

Since the first connecting portion 33 is provided with two conductive bridges 331 and corresponds to two connecting wires, even if part of the conductive bridges 331 are damaged, the remaining conductive bridges 331 can still make the first connecting portions 33 and the corresponding touch electrodes form a path. For example, if any one of the two conductive bridges 331 in FIG. 6 is damaged, the remaining conductive bridges 331 are still on; at the same time, the left end of one conductive bridge 331 and the right end of another conductive bridge 331 are destroyed, and the right end of the remaining one conductive bridge 331 and the left end of the other conductive bridge 331 are still conductive. Compared with the prior art shown in FIG. 1 to FIG. 4, the structural design of the first connecting portion 33 in the first embodiment obviously reduces the probability of breaking due to bending stress of the touch wire, thereby improving the reliability of the touch wire.

Further, as shown in FIG. 6 and FIG. 8, the second connecting portion 53 extends from the second touch electrode 51 itself.

Preferably, the material of the first touch electrode 31, the first connecting portion 33 and the second touch electrode 51 is indium tin oxide (ITO) with good light transmittance, the structure of the first connecting portion 33 is designed to compensate for the poor resistance to bending of the ITO.

The material of the insulating block 4 is silicon oxide (SiOx), silicon nitride (SiNx) or a combination of both.

In conjunction with FIGS. 8 and 9, the first connecting portion 33 and the insulating block 4 are further provided with a passivation layer 9.

Figure 5:
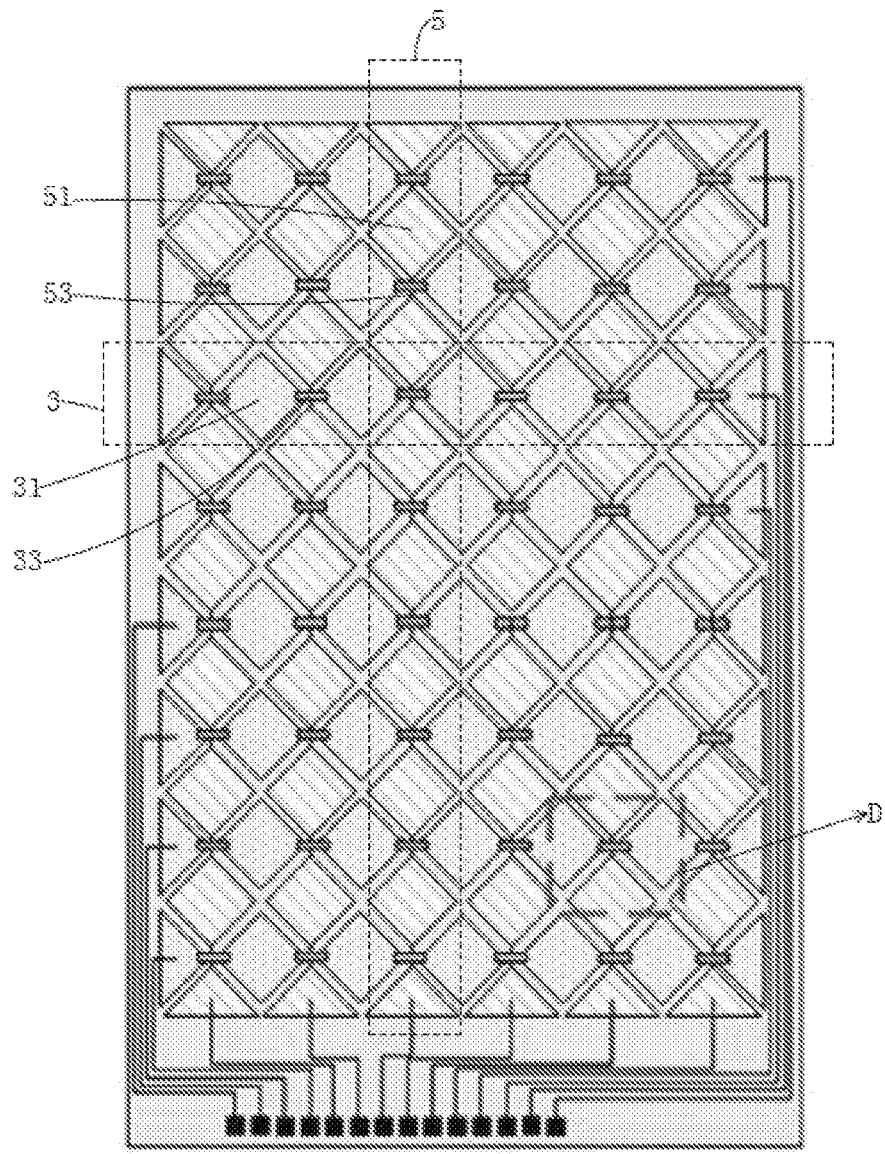
FIG. 5 is a top view of the touch panel structure of the present disclosure.
Figure 10:
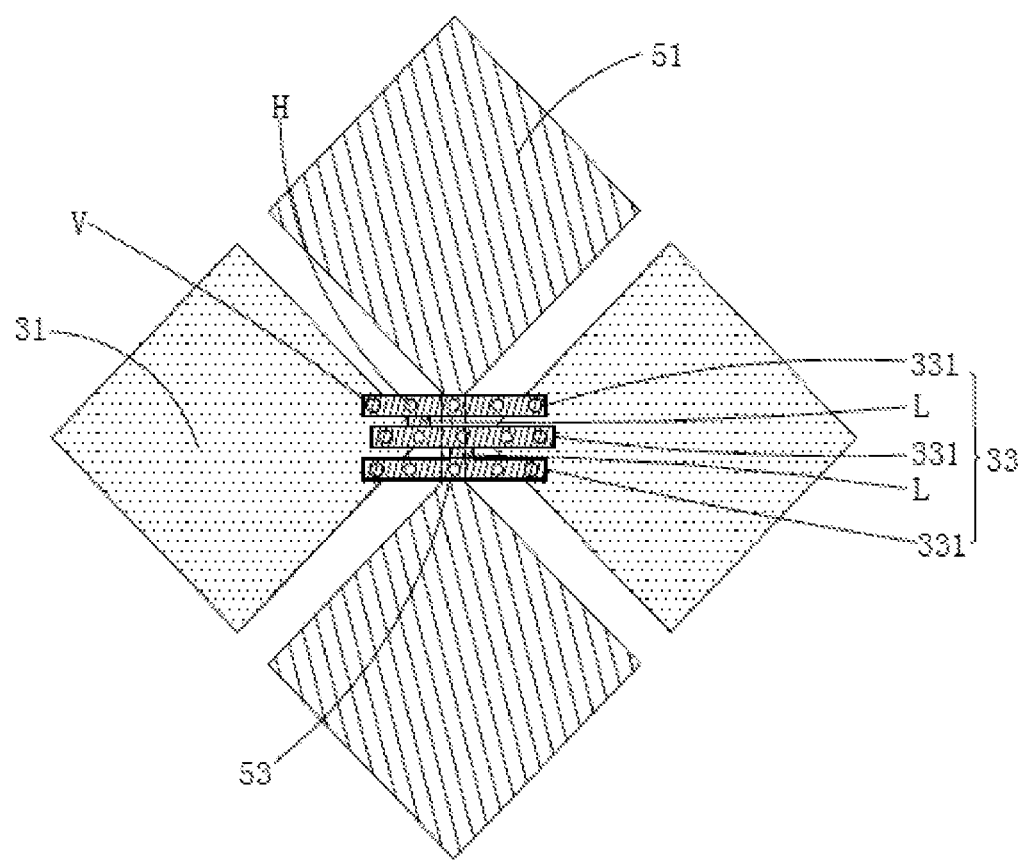
FIG. 10 is a partial enlarged diagram of a second construction corresponding to D in FIG. 5.

With reference to FIG. 5 and FIG. 10, and referring to FIG. 9, compared with the first embodiment, the second embodiment of the touch panel structure of the present disclosure changes the structure of the first connecting portion 33: the first connecting portion 33 includes three conductive bridges 331 parallel to each other. The two adjacent conductive bridges 331 are connected by a connecting strap L, and each of the connecting straps L is not disposed on the same straight line parallel to the second touch electrode chain 5 to avoid stress concentration caused by the connecting strap L when the touch panel bends. The rest of the structure is the same as that of the first embodiment, and details are not described herein again. Since the first connecting portion 33 in the second embodiment includes three conductive bridges 331, the two ends of each of the conductive bridges 331 respectively contact the two adjacent first touch electrodes 31 so as to increase the contact area between the first connecting portions 33 and the corresponding touch electrodes and reduce the contact resistance, so that the first connecting portion 33 and the corresponding touch electrode conduction smoothly. Because there are hollows between different conductive bridges 331, a plurality of middle holes H are provided on each of the conductive bridges 331, each of the via holes V on the same side of the first connecting portion 33 is not on the same straight line parallel to the second touch electrode chain 5, the bridge length direction of the conductive bridge 331 is consistent with the bending axis direction of the touch panel, and each of the connection straps L is not on the same straight line parallel to the second touch electrode chain 5, the bending stress that the first connecting portion 33 receives when the touch panel is bent can be greatly reduced, so as to reduce the risk of fracture of the connecting line caused by the bending stress. In addition, even if part of the conductive bridges 331 are damaged, the remaining conductive bridges 331 can still make the first connecting portions 33 and the corresponding touch electrodes form a path, so that the reliability of the touch control circuit can be improved.

Figure 11:
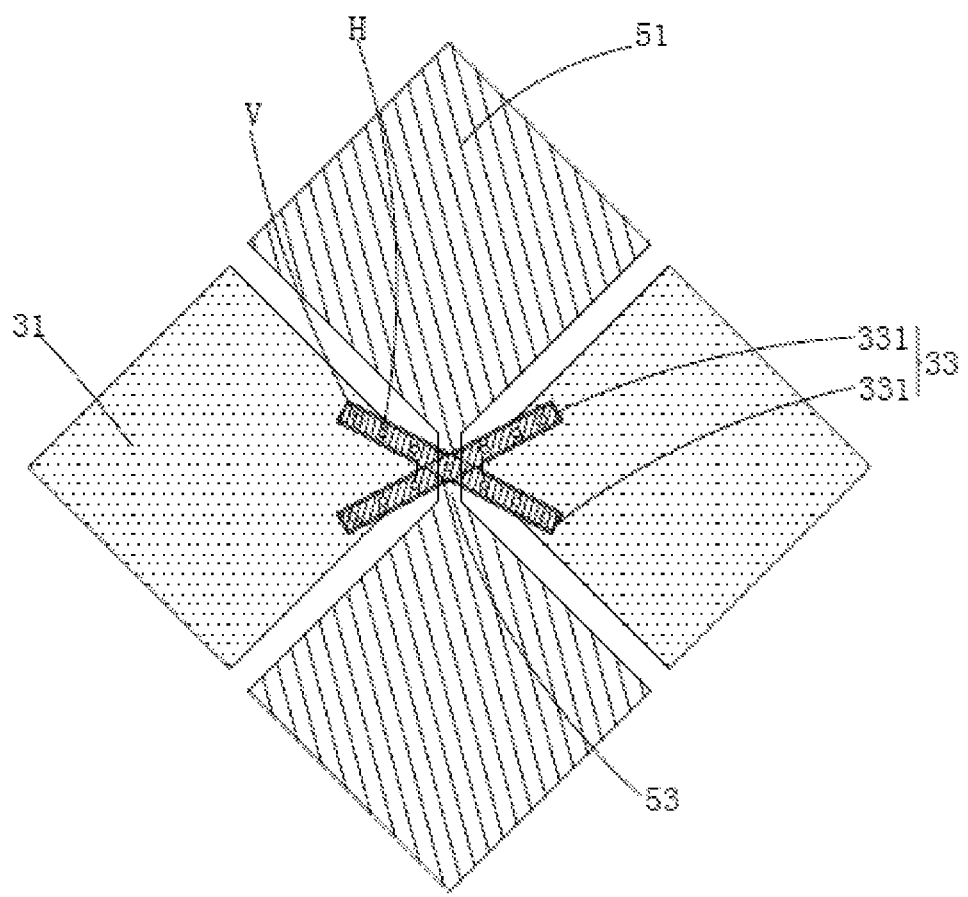
FIG. 11 is a partial enlarged diagram of a third configuration corresponding to D in FIG. 5.

Combining FIG. 5 and FIG. 11, compared with the first embodiment, the third embodiment of the touch panel structure of the present disclosure changes the structure of the first connecting portion 33: the first connecting portion 33 includes two conductive bridges 331 cross-connected to each other. The first connecting portion 33 is substantially "X"-shaped. The rest of the structure is the same as that of the first embodiment, and details are not described herein again.

Since the first connecting portion 33 in the third embodiment includes two conductive bridges 331, the two ends of each of the conductive bridges 331 respectively contact the two adjacent first touch electrodes 31 so as to increase the contact area between the first connection portions 33 and the corresponding touch electrodes and reduce the contact resistance, so that the first connecting portion 33 and the corresponding touch electrode conduction smoothly. Due to the hollow between the different conductive bridges 331, a plurality of middle openings H are provided on each of the conductive bridges 331 and each of the via holes V on the same side of the first connecting portion 33 is not on the same straight line parallel to the second touch electrode chain 5, the bending stress that the first connecting portion 33 receives when the touch panel is bent can be greatly reduced, so as to reduce the risk of fracture of the connecting wire caused by the bending stress. In addition, even if part of the conductive bridges 331 are damaged, the remaining conductive bridges 331 can still make the first connecting portions 33 and the corresponding touch electrodes form a path, so that the reliability of the touch control circuit can be improved.

Figure 12:
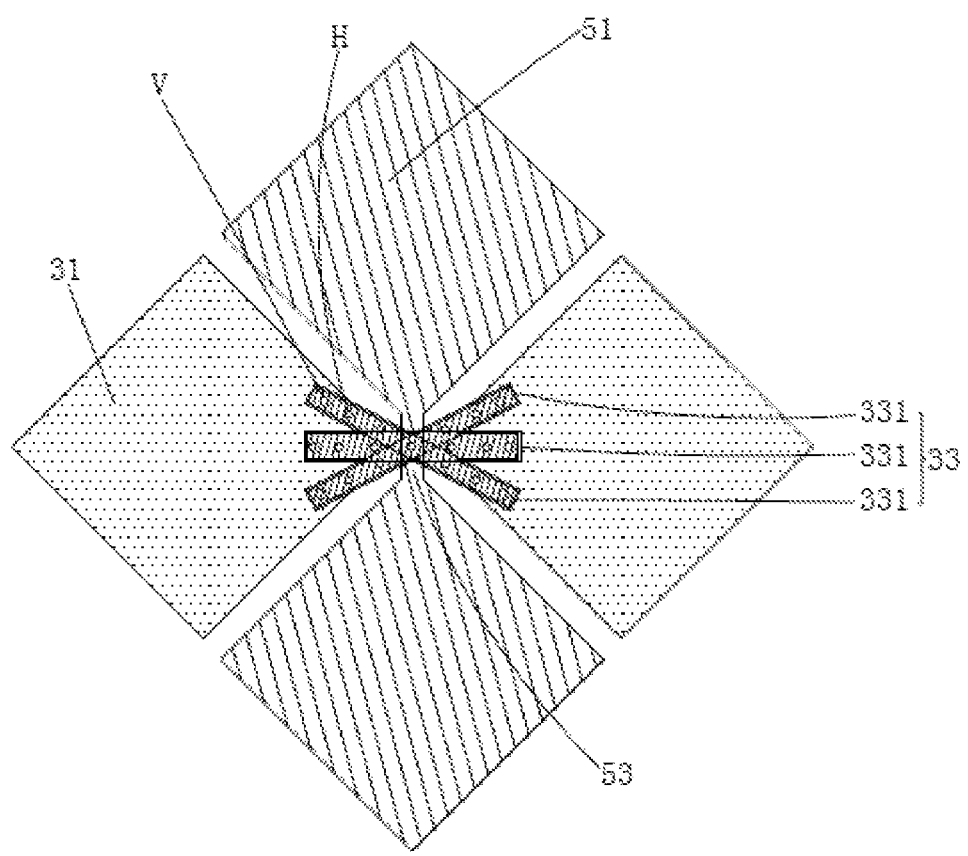
FIG. 12 is a partial enlarged diagram of the fourth structure corresponding to D in FIG. 5.

In conjunction with FIG. 5 and FIG. 12, compared to the first embodiment, the fourth embodiment of the touch panel structure of the present disclosure changes the structure of the first connecting portion 33: the first connecting portion 33 includes three conductive bridges 331 cross-connected to each other. The first connecting portion 33 is similar to the "*" shape. The rest of the structure is the same as that of the first embodiment, and details are not described herein again.

Since the first connecting portion 33 in the fourth embodiment includes three conductive bridges 331, the two ends of each of the conductive bridges 331 respectively contact the two adjacent first touch electrodes 31 so as to increase the contact area between the first connection portions 33 and the corresponding touch electrodes and reduce the contact resistance, so that the first connecting portion 33 and the corresponding touch electrode conduction smoothly. Due to the hollow between the different conductive bridges 331, a plurality of middle openings H are provided on each of the conductive bridges 331 and each of the via holes V on the same side of the first connection portion 33 is not on the same straight line parallel to the second touch electrode chain 5, the bending stress that the first connecting portion 33 receives when the touch panel is bent can be greatly reduced, so as to reduce the risk of fracture of the connecting wire caused by the bending stress. In addition, even if part of the conductive bridges 331 are damaged, the remaining conductive bridges 331 can still make the first connecting portions 33 and the corresponding touch electrodes form a path, so that the reliability of the touch control circuit can be improved.

Of course, if space permits, the first connecting portion 33 may further be configured to include four or more conductive bridges 331. The present disclosure further provides a flexible touch display device including a flexible touch panel having any one of the above structures, and the structure of the flexible touch panel will not be repeatedly described herein.

In summary, the touch panel structure and the flexible touch display device of the present disclosure include a plurality of first touch electrode chains and a plurality of second touch electrode chains insulated from and cross-insulated from the first touch electrode chains. Each of the first touch electrode chains includes a plurality of spaced first touch electrodes, and the adjacent two of the first touch electrodes are electrically connected through a first connecting portion, the first connecting portion includes at least two conductive bridges; the two adjacent second touch electrodes are electrically connected by a second connecting portion, and the first connecting portion is stacked on the second connecting portion and insulated from the second connecting portion. Since the first connecting portion includes at least two conductive bridges, the two ends of each of the conductive bridges respectively contacting the two adjacent first touch electrodes can increase the contact area between the first connecting portion and the corresponding touch electrodes and reduce the contact resistance, so that the first connecting portion and the corresponding touch electrode conduction smoothly. Because of the hollowness between the different conductive bridges, the bending stress that the first connecting portion receives when the touch panel is bent can be reduced, so as to reduce the risk of fracture of the connecting wire caused by the bending stress. In addition, even if part of the conductive bridges are damaged, the remaining conductive bridges can still make the first connecting portion and the corresponding touch electrodes form a path, so that the reliability of the touch control circuit can be improved.

As above, for those skilled in the art, various other appropriate changes and modifications may be made according to the technical solutions and technical solutions of the present disclosure, and all such changes and modifications shall fall within the protection scope of the appended claims of the present disclosure.

What is claimed is:

1. A touch panel structure, comprising:
    a plurality of first touch electrode chains, wherein the plurality of the first touch electrode chains are arranged at intervals, each of the first touch electrode chains comprises a plurality of spaced first touch electrodes, two adjacent first touch electrodes are electrically connected by a first connecting portion, and the first connecting portion comprises at least two conductive bridges;
    a plurality of second touch electrode chains, wherein the plurality of the second touch electrode chains are arranged at intervals, the second touch electrode chains are cross-insulated from the first touch electrode chains; each of the second touch electrode chains comprises a plurality of spaced second touch electrodes, two adjacent second touch electrodes are electrically connected through a second connecting portion, the first connecting portion is stacked on the second connecting portion and insulated from the second connecting portion;
    wherein an insulating block is provided between the second connecting portion and the first connecting portion stacked on the second connecting portion; two ends of each of the conductive bridges respectively contact with the two adjacent first touch electrodes through a via hole passing through the insulating block;
    wherein each of the conductive bridges is provided with a plurality of middle openings;
    wherein each of the via holes on a same side of the first connecting portion is not on a same straight line parallel to the second touch electrode chain;
    wherein the at least two conductive bridges are parallel to each other, and two adjacent conductive bridges are connected by a connecting strap.

2. The touch panel structure according to claim 1, wherein each of the connecting straps is not on the same straight line parallel to the second touch electrode chain.

3. The touch panel structure according to claim 1, wherein the at least two conductive bridges are cross-connected to each other.

4. The touch panel structure according to claim 1, wherein the second connecting portion extends from the second touch electrode itself.

5. The touch panel structure according to claim 1, wherein a bridge length direction of the conductive bridge is consistent with a bending axis direction of the touch panel.

6. A flexible touch display device comprising the touch panel structure according to claim 1.

7. A touch panel structure, comprising:
a plurality of first touch electrode chains, wherein the plurality of the first touch electrode chains are arranged at intervals, each of the first touch electrode chains comprises a plurality of spaced first touch electrodes, two adjacent first touch electrodes are electrically connected by a first connecting portion, and the first connecting portion comprises at least two conductive bridges;
a plurality of second touch electrode chains, wherein the plurality of the second touch electrode chains are arranged at intervals, the second touch electrode chains are cross-insulated from the first touch electrode chains; each of the second touch electrode chains comprises a plurality of spaced second touch electrodes, two adjacent second touch electrodes are electrically connected through a second connecting portion, the first connecting portion is stacked on the second connecting portion and insulated from the second connecting portion;
wherein an insulating block is provided between the second connecting portion and the first connecting portion stacked on the second connecting portion; two ends of each of the conductive bridges respectively contact with the two adjacent first touch electrodes through a via hole passing through the insulating block;
wherein each of the conductive bridges is provided with a plurality of middle openings;
wherein each of the via holes on a same side of the first connecting portion is not on a same straight line parallel to the second touch electrode chain;
wherein the second connecting portion extends from the second touch electrode itself;
wherein the at least two conductive bridges are parallel to each other, and two adjacent conductive bridges are connected by a connecting strap.

8. The touch panel structure according to claim 7, wherein each of the connecting straps is not on the same straight line parallel to the second touch electrode chain.

9. The touch panel structure according to claim 7, wherein the at least two conductive bridges are cross-connected to each other.

10. The touch panel structure according to claim 7, wherein a bridge length direction of the conductive bridge is consistent with a bending axis direction of the touch panel.

* * * * *